US008095922B2

(12) United States Patent
Wong

(10) Patent No.: US 8,095,922 B2
(45) Date of Patent: Jan. 10, 2012

(54) CONSTRUCTOR ARGUMENT OPTIMIZATION IN OBJECT MODEL FOR FOLDING MULTIPLE CASTS EXPRESSIONS

(75) Inventor: Michael Wong, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1168 days.

(21) Appl. No.: 11/847,164

(22) Filed: Aug. 29, 2007

(65) Prior Publication Data
US 2009/0064116 A1 Mar. 5, 2009

(51) Int. Cl.
G06F 9/44 (2006.01)
G06F 9/45 (2006.01)

(52) U.S. Cl. ............... 717/152; 717/116

(58) Field of Classification Search .......... None
See application file for complete search history.

(56) References Cited

U.S. PATENT DOCUMENTS

| | | | | |
|---|---|---|---|---|
| 5,371,891 A * | 12/1994 | Gray et al. | ........... | 717/140 |
| 5,410,705 A * | 4/1995 | Jones et al. | ........... | 717/168 |
| 5,689,711 A * | 11/1997 | Bardasz et al. | ......... | 717/105 |
| 5,752,034 A * | 5/1998 | Srivastava et al. | ........ | 717/130 |
| 6,230,314 B1 * | 5/2001 | Sweeney et al. | ......... | 717/108 |
| 6,446,259 B2 * | 9/2002 | Brett | .............. | 717/165 |
| 6,754,887 B1 * | 6/2004 | Gil et al. | .............. | 717/116 |
| 6,993,744 B2 | 1/2006 | Hills | | |
| 7,032,230 B2 | 4/2006 | Gray-Donald | | |
| 7,127,710 B2 * | 10/2006 | Ghiya et al. | ............ | 717/151 |
| 2002/0040410 A1 | 4/2002 | Leach et al. | | |
| 2004/0128657 A1 | 7/2004 | Ghiya et al. | | |
| 2004/0154008 A1 * | 8/2004 | Bak et al. | ............... | 717/151 |
| 2004/0194057 A1 | 9/2004 | Schulte et al. | | |
| 2004/0216146 A1 | 10/2004 | Sanchez, II et al. | | |
| 2005/0050521 A1 | 3/2005 | Chang | | |
| 2005/0097514 A1 | 5/2005 | Nuss | | |
| 2005/0144914 A1 | 7/2005 | Huehn et al. | | |
| 2006/0150164 A1 | 7/2006 | Agrawal et al. | | |

OTHER PUBLICATIONS

Bruce Eckel, "Thinking in C++", Feb. 19, 2003, Internet Archive, accessed online at <http://replay.waybackmachine.org/20030219122623/http://www.codeguru.com/cpp/tic/tic0249.shtml>, 4 selected pages.*
Wittenberg, "A C++ String Class", Listing 5, 1994.
Chang, et al, "Measuring Dynamic Memory Invocations in Object-Oriented Programs", IEEE 1999, pp. 268-274.
"Using C++ to Define Abstract Data Types", [Online] [http://www.cse.sc.edu/~vargasje/CSCE350_Spring2003/Docs/CPP2.pdf.].
R. Najjar, et al "The Role of Constructors in the Context of Re-factoring Object-Oriented Systems", Proceedings of the Seventh European Conference on Software Maintenance and Reengineering 2003, IEEE 2003.
Allen Holliday, "C++ Files" Revision 2, Feb. 3, 2005.

* cited by examiner

Primary Examiner — James D Rutten
(74) Attorney, Agent, or Firm — Cantor Colburn LLP; Libby Toub

(57) ABSTRACT

A method and computer program product for providing an optimization for a most derived object during compile time are provided. The optimization determines whether a most derived class object is present during a compile time. Also, the optimization utilizes the most derived class object to obtain a location of a virtual base for the most derived class object during the compile time, and provides the virtual base of the most derived class object during the compile time. The method is executed for a constructor and/or a destructor. The constructor or destructor contains arguments which require conversion to a base type, and the conversion is performed at compile-time instead of at runtime.

2 Claims, 3 Drawing Sheets

CONSTRUCTOR ARGUMENT OPTIMIZATION IN OBJECT MODEL FOR FOLDING MULTIPLE CASTS EXPRESSIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to improving the execution speed of C++ programs when C++ programs are compiled with a C++ compiler, and particularly to providing a C++ compile time optimization.

For a C++ hierarchy of classes, arguments can be passed in constructors. These constructor arguments can be further casted to different types through the constructor call, and through the prototype of the constructor arguments. In traditional models, this chain of casts can be a complex runtime expression, which is normal under the most pessimistic assumptions. Example 1 illustrates such a complex runtime expression:

```
#include<stdio.h>
class V
    {
    public:
    virtual int f( ) { return 'V'; };
    int v;
    };
class A: public virtual V{
    public:
    virtual int f( ) {return 'A'; };
    int a;
};
class B : public virtual V
    {
    public:
    B(V *); //Here it is further casted to a V*
    int f( ) { return 'B'; }
    int b;
    };
class D: public virtual A, public virtual B {
    public:
    D( ) : B((A*)this) { } // Note the cast of this (which is a D * )
    to an A*
    int f( ) { return 'D'; }
    };
B::B(V *v )
    {
      if( v->f( ) == 'B')
         printf("SUCCESSFUL!\n");
      else
         printf("FAILED!\n");
    }
int main (void)
{
   D d;
}
```

EXAMPLE (1)

The class hierarchy for this example program is:

The C++ object model defines the internal memory layout of C++ objects and describes how the polymorphic features of C++ can be implemented. As such, it has significant impact on the execution speed of C++ programs. Past research has shown that different object model features can lead to 5-30% change in execution speed. One such feature is an object construction that requires calling subobject constructors. Any object argument passed to the object constructor may require casting from one type to another. This can happen if there is an explicit cast (for example "(A*) this" in the above example 1), or an implicit cast through the prototype (B constructor accepts a V*). When these casts involve virtual bases, as in the Example 1 above, where both A and V are virtual, then the casts conversions require a complex runtime expression to be run during runtime.

For a constructor D whether D is a most-derived or a base subobject, the code is often expanded into more complex code to support the object-oriented aspect of C++. These include the implicit construction of bases, the setting of the virtual function pointer, the building of members, and in the case of destructors, the calling of delete to tree the object memory.

For the most-derived class D, it must construct virtual base A, then virtual bases B and C. But when these virtual base constructors are called in current object models, they will be passed a flag (_doBase) at runtime to indicate that they are constructing a subobject, and there is no need to construct their virtual subobjects. There will be a few other arguments passed as well which do not impact the discussion, and this is the normal state of the art.

As seen herein:

offsetof(D,V)=This will return the byte offset of a given member in the class, in this case V in D;

ptr->VFP=The VFP is the first element in a class structure, normally the virtual function pointer, explicitly casted to be a pointer to an array of type Virtual Function Fable; and vtt=Virtual Function Table Table, this is a table of pointers to final VFTs and construction VFTs used for various phases of object construction.

Example 2 illustrates the general coding pattern of a constructor:

```
D::D(D* this, bool _doBase, ... ) {
if (_doBase) {
// construct virtual base
    ta = (V*) ((long) this + offsetof(D,V));
    *V::V(ta);
    *A::A((A*) (this + offsetof(D,A)), false, &(_vtt[3]));
    *B::B((B*) (this + offsetof(D,B)), false, &(_vtt[5]));
}
//construct non-virtual bases (none)
// assign B's VFT entry
B* tc = (B*) ((long) this + offsetof(D,B));
tc->VFP = (long *) _vtt[0];
// assign D's VFT entry
this->VFP = (long *) _vtt[1];
// re-assign base class VFTs
V* ta    = VBI(this,-4);
ta->VFP  = (long *) _vtt[2];
/* user code */
return 0,this;
}
```

EXAMPLE (2)

The actual pseudo code generated by the compiler under the current object model where the virtual base offsets are stored in the vft is in Example 3.

In this code @number is a compiler-generated temporary generated code for the most-derived constructor for: D::D( ).

```
{
  if (_doBase == 1) {
//Call the Base constructors for V and A
...
//Now call the base constructors for B
 //we need to set the final VFT here because we will be using the VFT expression in the
statement indicated by (1)
    this->0 = *((char **) (_vtt + 12));
    (@6 = this , (B *) (@6 + *((long *) (@6->0 + -24))))->0 = *((char **) _vtt);
    (@7 = this , (A *) (@7 + *((long *) (@7->0 + -20))))->0 = *((char **) (_vtt + 4));
    (@8 = this , (V *) (@8 + *((long *) (@8->0 + -16))))->0 = *((char **) (_vtt + 8));
    B::B((B *) (this + 20), 0, _vtt + 24, (@4 = (@3 = this // this pointer , (A *) (@3 +
*((long *) (@3->0 + -20)))) , ( @4 == 0 ? 0 : @5 = @4 , (V *) (@5 + *((long *) (@5->
0+ -16))) ))); //(1) a comma expression that first looks up the virtual base offset of V in
the VFT at –16 (cast it to V *), then look up the virtual base offset of A in the VFT at –20
(cast it to A*)
//The –4, –8 location in the VFT is used for Runtime type Identification, the –24 location
is used for the offset of the virtual base B, the –12 location is used for the offset of the D
in D (not really necessary but it is just what this object model do)
//The offsets are negative because that is how we store the virtual base offsets to maintain
compatibility with older virtual function tables, the positive direction contain the virtual
function addresses
 };
//Now set the VFT based on the Virtual Function Table Table entries (VTT)
...
}
```

EXAMPLE (3)

It would be desirable to replace complex runtime expressions shown in Example 3 that run during runtime with compile expressions that run during compile time.

SUMMARY

A method for providing an optimization for a most derived object during compile time is provided. The optimization determines whether a most derived class object is present during compile time. Also, the optimization utilizes the most derived class object to obtain a location of a virtual base for the most derived class object during compile time, and provides the virtual base of the most derived class object during the compile time. It will use this information to compute the location of cast expressions to a base class at compile time.

A computer program product, tangibly embodied on a computer readable medium for providing art optimization for a most derived object during compile time is provided. The computer program product includes instructions for causing a computer to execute the above method.

System and computer program products corresponding to the above-summarized methods are also described and claimed herein, Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages are apparent from the following detailed description taken in conjunction with the accompanying drawings in which:

Figure 1:
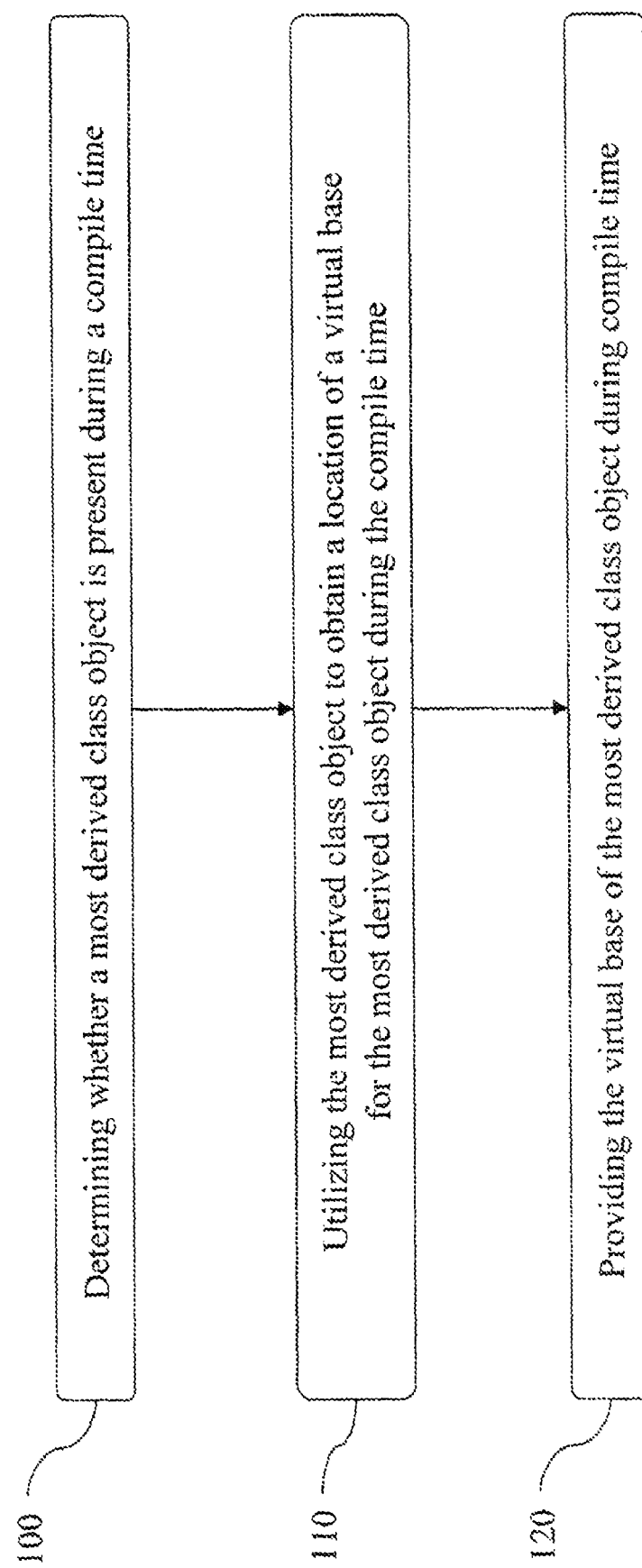
FIG. 1 illustrates a method for providing an optimization for a most derived object during compile time in accordance with an exemplary embodiment.

The detailed description explains the exemplary embodiments of the invention, together with advantages and features, by way of example with reference to the drawings.

DETAILED DESCRIPTION

The exemplary embodiment may be applied to various applications including any business or scientific applications written in C++. In the exemplary embodiment, the optimization works when performed from the most-derived object, and the optimization can replace the expression in Example 3. In the exemplary embodiment, the most derived object can confidently identity where the virtual base subobjects are located.

However, a subobject constructor will not know the location of the virtual base without referencing the runtime expression. The runtime expression in Example 4 is for locating virtual base subobjects that, are often accessed through a virtual function expression if the virtual base location is stored in the virtual function table or through virtual base pointers otherwise, which both require an indirect reference obtained at runtime. Traditional object models simply use the same code for the constructor of a most-derived class and for a base class. For example, D constructor when D is the most-derived is the same code for when D is part of a deeper hierarchy chain. Example 3 saves on having to generate different code implementation for the same mangled function name which is difficult to handle. The same function name but different implementation also makes it nontrivial to implement. Traditional object models use the same code for the constructor regardless of whether the class is the most-derived or is the base class, and rely on a runtime flag to be set to evaluate whether the traditional object models are constructing a most-derived object or a subobject; different implementation may need to be generated for the same constructor function name. This is because the constructor code, in traditional object models, will always make the worst, case assumption, that the virtual base subobject location can only be known at runtime, and therefore generate a runtime expression because the constructor code may be used as part of some base class.

Although such assumptions are made in traditional object models, these assumptions are not true. In accordance with the exemplary embodiment, if one is building an object as a most-derived object, the optimization can identify all the information regarding where the object will be placed in memory at compile time because the compiler must layout the object at compile time. In the exemplary embodiment; casts of argument expressions can be performed at compile time.

However, in the traditional object models, when building the object as a subobject of a further derived object (i.e., constructed as a base of another object), and when this object is a virtual base, it is not possible in general to know at compile time where other virtual bases are placed because the location of the virtual bases depends on the relative position with the most-derived object. The placement of the virtual base subobject can vary by a significant amount depending on how far away the most-derived object is. Since the same code is used, in the traditional object models, a worst case scenario must be employed to find subobjects, especially where the subobject look-up involves an indirection like going to the Virtual Function Fable (vft). Virtual base table, or Virtual Base pointers. This is because the location offset of the virtual base is frequently stored in the vft in most recent object models such as IBM's® object model or in the virtual base table as in Microsoft's COM™ object model. Finding a subobject location in constructors is necessary whenever there is a cast for an argument passed to a constructor and then to the constructor's subobject.

In the exemplary embodiment, for a C++ hierarchy of classes, arguments can be passed in constructors. These constructor arguments can be further casted to different types through the constructor call, and through the prototype of the constructor arguments. In the exemplary embodiment, this chain of casts can be optimized to yield one single compile time computation such that the result type of this chain of casts is known at compile time, rather than having a complex runtime expression as normally used under the most pessimistic assumptions (e.g., for the object model shown in Example 1).

In the exemplary embodiment, the object model (may be, e.g., a C++ABI object model) separates the C++ constructor and destructor into an in-charge and non-in-charge constructors and destructors. The optimization utilizes this concept of separately identifying constructor/destructor types based on in-charge (most-derived constructor) or non-incharge (base constructor). In any object model (such as the C++ABI object model) that allows one to generate different code for the same constructor to D, it is possible to identify the case when D is most-derived and when D is not most-derived but is a base of some other further derived object, in accordance with the exemplary embodiment. The most-derived constructor calls base constructors to construct its bases. The code for the two constructors is actually different. The base constructor never calls the subobject virtual base construction and requires a Virtual Function Table Table (vtt) to be passed in. The most-derived constructor does not require a vtt to be passed in and should already know its final vft and the vtt.

In the exemplary embodiment, at compile time, the optimization can shortcut certain expressions (such as those in Example 3) so that the expressions do not have to go to the vft in the runtime expression. In the traditional object model, cast expressions to a virtual base in the constructor argument is one that would normally require such a transformation to access the vft to the virtual base. However, the optimization determines whether or not the constructor is a most-derived constructor, and then the optimization can directly calculate the location of the virtual base because the optimization knows the location of every subobject, in accordance with the exemplary embodiment.

The code in Example 1 demonstrates the problem, but it is understood that there are many styles of hierarchies that can utilize the optimization of the exemplary embodiment, in the exemplary embodiment, the optimization may be utilized when, e.g., there are a number of virtually-derived bases and there is a constructor argument expression that has an explicit cast or an implicit cast through the prototype to these virtual bases. Additional benefits are achieved when there are more virtual bases involved in the cast.

FIG. 1 illustrates a method for providing an optimization for a most derived object during compile time in accordance with the exemplary embodiment. The optimization determines whether a most derived class object is present during a compile time at 100. The optimization utilizes the most derived class object to obtain a location of a virtual base for the most derived class object during the compile time at 110, and the optimization provides the virtual base of the most derived class object during compile time at 120.

Figure 2:
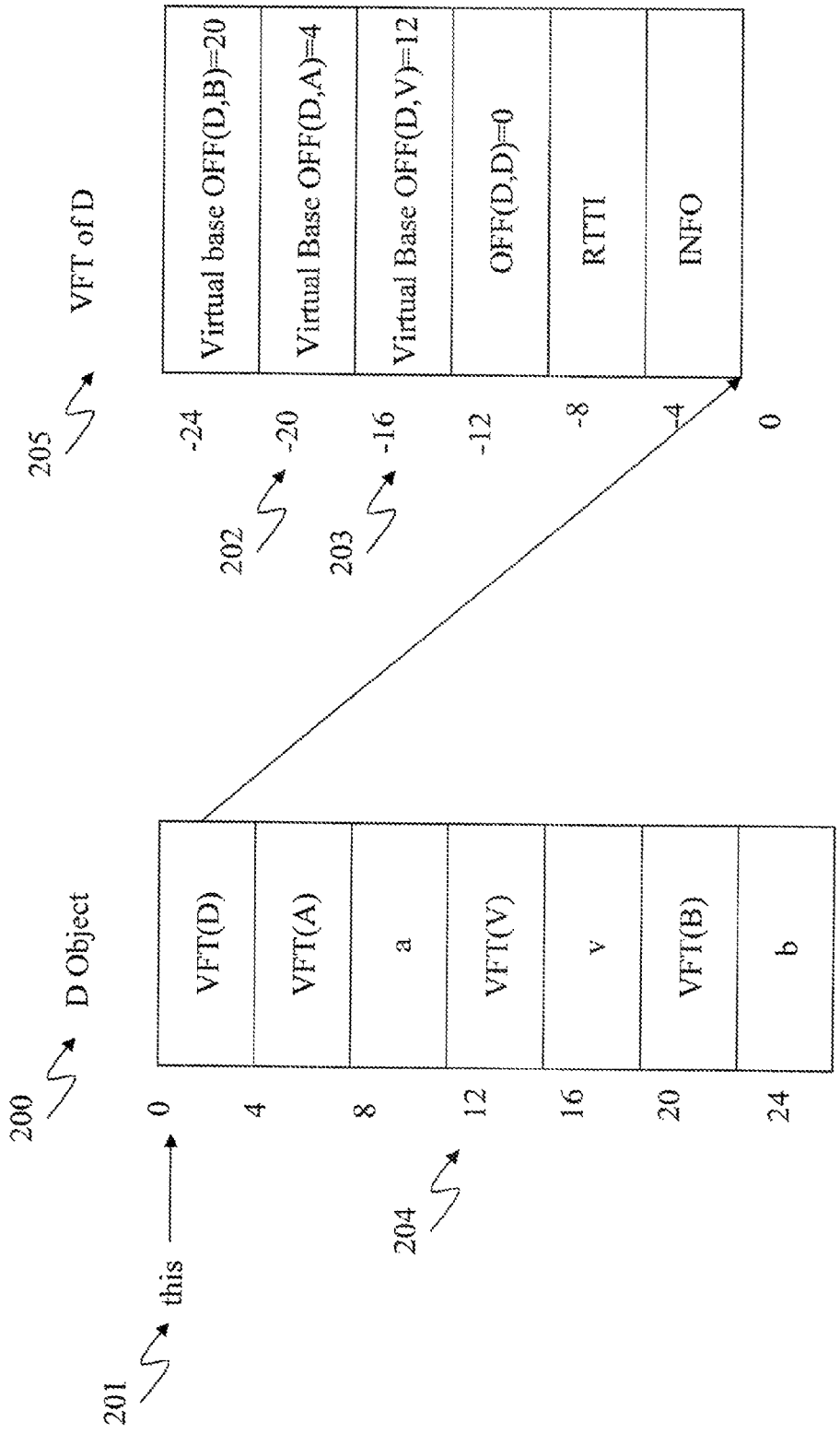
FIG. 2 illustrates a non-limiting example of accessing a virtual base before and after the optimization of the exemplary embodiment.

FIG. 2 illustrates a non-limiting example of accessing a virtual base before optimization and after optimization in accordance with the exemplary embodiment. The object layout of the most-derived object D is at 200, and the final Virtual function Table of the most-derived object D is at 205. Before optimization, one would need to adjust the this pointer for the cast expression by accessing the items in 201, and adding the value found in 202 and 203 which contain the virtual base offset of A and V respectively. These values of 4 and 12, respectively in 202 and 203, are only known at runtime and not at compile-time for a base constructor.

After the optimization of the exemplary embodiment, because the optimization recognizes that 200 is a most-derived constructor, the optimization can access the exact location of V by accessing the items in 201 and 204 with the offset ÷12 which is the location of the V base subobject.

Below is a non-limiting example of implementing the optimization using compiler generated code for the base constructor for D::D( ) (herein designated as Example 4), in accordance with the exemplary embodiment.

```
{
  {
    this->0 = *((char **) _vtt);
    (@7 = this , (A *) ((@7 + *((int *) (@7->0 + -12))))->0 =
    *((char **) (_vtt + 4));
    (@8 = this , (V *) ((@8 + *((int *) (@8->0 + -16))))->0 =
    *((char **) (_vtt + 8));
    (@9 = this , (B *) ((@9 + *((int *) (@9->0 + -20))))->0 =
    *((char **) (_vtt + 12));
  }
  // Run the user code
  return 0, this;
}
```

EXAMPLE (4)

The constructor in Example 4 is used for constructing D as a subobject base class of a further derived class so the pseudo code does not contain any constructions of its virtual bases.

Below is a non-limiting example of implementing the optimization using compiler generated code for the most-derived constructor for: D::D( ) (herein designated as Example 5), in accordance with the exemplary embodiment.

```
{
{
//Call the virtual base constructors for V and A
...
//Now call the base constructor for B
{
//this optimization makes this code generation unnecessary as we no longer need to access the vft
// this->0 = *((char **) (_vtt + 12));
//(@6 = this , (B *) (@6 + *((long *) (@6->0 + -24))))->0 = *((char **) _vtt);
//(@7 = this , (A *) (@7 + *((long *) (@7->0 + -20))))->0 = *((char **) (_vtt + 4));
//(@8 = this , (V *) (@8 + *((long *) (@8->0 + -16))))->0 = *((char **) (_vtt + 8));
}
//Before the optimization, this code is not necessary after the optimization of this patent
//B:B((B *) (this + 20), 0, _vtt + 24, (@4 = (@3 = this , (A *) (@3 + *((long *) (@3->0 + -20)))) , ( @4 == 0 ? 0 : @5 = @4 , (V *) (@5 + *((long *) (@5->0+ -16)))
)));
//After the optimization, the above code is reduced to a compile-time expression
B::B((B *) (this + 20), 0, _vtt + 24, (@11 = (@10 = this , (V *) @11 +12));
//just adjust the argument 'this' to the final destination type (V*) by adding 12 to get to a V*
}
{
// Set the vft
}
//Run the user code
    return 0 , this;
}
```

EXAMPLE (5)

As shown in Example 5. the optimization identifies the actual location of the virtual base from the most-derived object by accessing the most-derived object's final VFT, in accordance with the exemplary embodiment. This VFT should have the offset location of all its virtual bases, and the optimization directly computes and fills in the slot value in constructor arguments that require access to the virtual base. Alternatively and/or additionally, the compiler should contain the memory map of the most-derived object and the location of any subobject can be accessed via the optimization.

Furthermore, where there are multiple casts (both in the argument and in the parameter), the optimization can avoid all the temporary generation, all the pre-generation of vfts to ensure safe access of the vft before the vft is actually officially set, and the multiple comma expression evaluation in accordance with the exemplary embodiment. To avoid the above, the optimization performs a compile-time calculation of the actual location offset of the final destination cast, which in effect allows the optimization to compile multiple casts in argument expressions at compile-time, further shortening the runtime execution. The exemplary embodiment also enables better optimization of the generated code by specific optimizers because the optimization is a simpler expression that can easily be identified by optimizers and enable more inlining.

Although the exemplary embodiment has discussed constructors, this optimization can also be applied to destructors in accordance with the exemplary embodiment.

Figure 3:
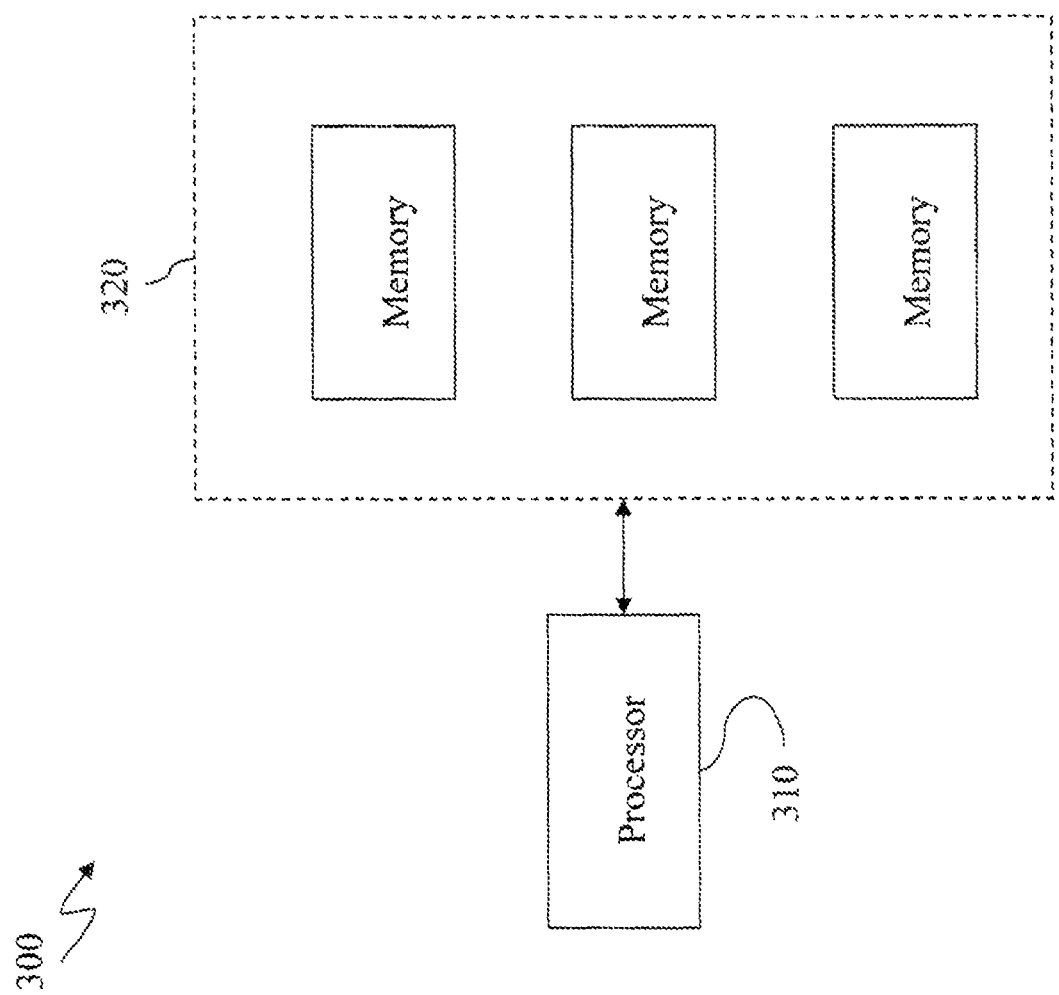
FIG. 3 illustrates a device in which the optimization may be implemented in accordance with the exemplary embodiment.

FIG. 3 illustrates a device in which the optimization may be implemented in accordance with the exemplary embodiment. The exemplary embodiment may be implemented in a device 300 (e.g., a general purpose computer), which includes a processor 310 executing computer program code stored on a storage medium, such as memory 320, in order to perform the processes described herein. The device 300 may include or may be operatively coupled to a display screen (not shown). It is understood that other processor-based devices (e.g., servers) may implement the exemplary processes described herein. The device 200 also includes all the necessary hardware and software to operate as a computing device to implement the exemplary embodiment.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities discussed herein. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention, for instance, the steps may be performed in a differing order, or steps may be added, deleted or modified. All of these variations are considered apart of the claimed invention.

While the exemplary embodiment to the invention has been, described, it will be understood that those skilled in the art, both now and in the future, may make various improvements and enhancements which fall within the scope of the claims which follow. These claims should be construed to maintain the proper protection for the invention first described.

What is claimed is:

1. A method for providing an optimization for a most derived object during compile time, the method comprising:
   determining whether the most derived class object is present during compile time;
   utilizing the most derived class object to obtain a location of a virtual base for the most derived class object during compile time;
   providing the virtual base of the most derived class object during compile time; and
   running the optimization during compile time in which the most derived class object does not require a virtual function-table table to be passed in and the most derived class object already knows a final most derived class virtual function-table table and a final most derived class virtual function table;
   wherein the optimization run during compile time performs a compile-time calculation to find a location offset of a final destination cast in order to allow the optimization to compile multiple casts in argument expressions during compile time, the optimization being run to avoid pre-generation of virtual function tables and to avoid multiple comma expression evaluation;
   wherein the optimization is executed for at least one of a constructor and a destructor;
   wherein the at least one of the constructor and the destructor contains arguments which require conversion to a base type; and
   wherein the conversion is performed at compile time instead of at runtime.

2. A computer program product, tangibly embodied on a computer readable medium, for providing an optimization for a most derived object during compile time, the computer program product including instructions for causing a computer to execute a method, comprising:
   determining whether the most derived class object is present during compile time;
   utilizing the most derived class object to obtain a location of a virtual base for the most derived class object during compile time;
   providing the virtual base of the most derived class object during compile time;
   running the optimization during compile time in which the most derived class object does not require a virtual function-table table to be passed in and the most derived class object already knows a final most derived class virtual function-table table and a final most derived class virtual function table;
   wherein the optimization run during compile time performs a compile-time calculation to find a location offset of a final destination cast in order to allow the optimization to compile multiple casts in argument expressions during compile time, the optimization being run to avoid pre-generation of virtual function tables and to avoid multiple comma expression evaluation;
   wherein the optimization is executed for at least one of a constructor and a destructor;
   wherein the at least one of the constructor and the destructor contains arguments which require conversion to a base type; and
   wherein the conversion is performed at compile time instead of at runtime.

* * * * *